US006564982B1

(12) United States Patent
Woods et al.

(10) Patent No.: US 6,564,982 B1
(45) Date of Patent: May 20, 2003

(54) IN-HANDLE STORAGE DEVICE

(76) Inventors: Charles Vernon Woods, 28924 Bailey La., Junction City, OR (US) 97448; David Allen Woods, 1414 Fetters Loop, Eugene, OR (US) 97402

( * ) Notice: Subject to any disclaimer, the term of this patent is extended or adjusted under 35 U.S.C. 154(b) by 109 days.

(21) Appl. No.: 09/928,065

(22) Filed: Aug. 10, 2001

(51) Int. Cl.[7] .............................................. B62K 21/12
(52) U.S. Cl. ..................... 224/420; 74/551.8
(58) Field of Search ........................ 224/420; 74/551.1, 74/551.8; 220/234, 235, 236, 237; 138/89

(56) References Cited

U.S. PATENT DOCUMENTS

| 3,918,323 | A | | 11/1975 | Prager |
| 4,329,076 | A | * | 5/1982 | Coreth |
| 4,623,954 | A | | 11/1986 | Schott et al. |
| 4,760,868 | A | * | 8/1988 | Saxon ........................ 220/237 |
| 4,875,142 | A | | 10/1989 | Spector |
| 5,247,431 | A | | 9/1993 | Liu |
| 5,683,200 | A | | 11/1997 | Levy |
| 5,797,431 | A | * | 8/1998 | Adams ....................... 220/237 |
| 5,950,498 | A | | 9/1999 | Gossett et al. |
| 6,081,190 | A | | 6/2000 | Kellermann |
| 6,308,590 | B1 | * | 10/2001 | Berto ......................... 74/551.8 |
| 6,378,815 | B1 | * | 4/2002 | Lee ............................ 224/420 |

OTHER PUBLICATIONS

Catalog: Harley–Davidson 2002 Genuine Motor Accessories and Genuine Motor Parts p. 574 "multi–fit".

* cited by examiner

*Primary Examiner*—Nathan J. Newhouse
(74) *Attorney, Agent, or Firm*—Rose Jade

(57) ABSTRACT

A storage tube for fixed installation inside the handlebar of a bicycle or motorcycle, that is designed to protect stored contents from rain and debris, and to provide a convenient means for carrying a motorcycle registration and the like, and the storage function of which is designed to be inconspicuous to casual passersby.

17 Claims, 2 Drawing Sheets

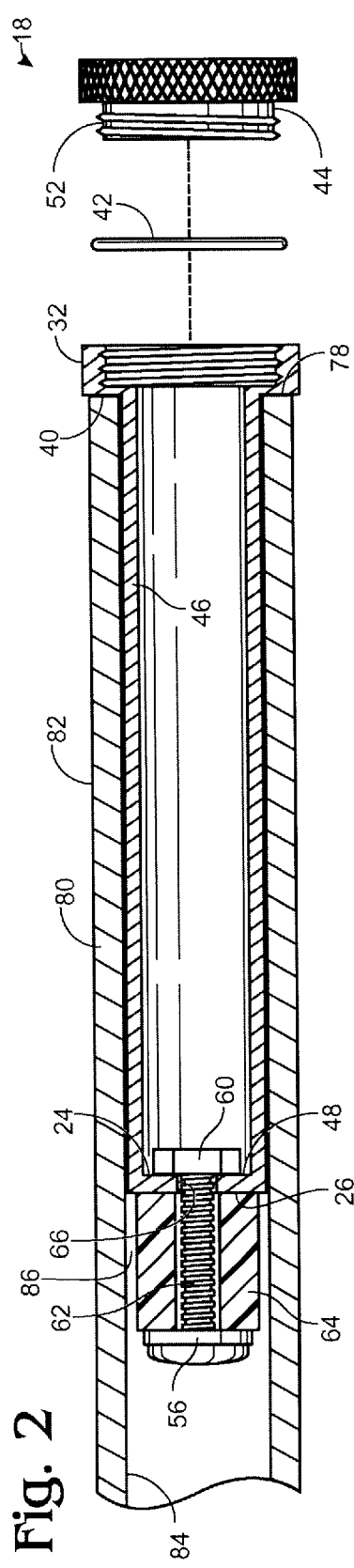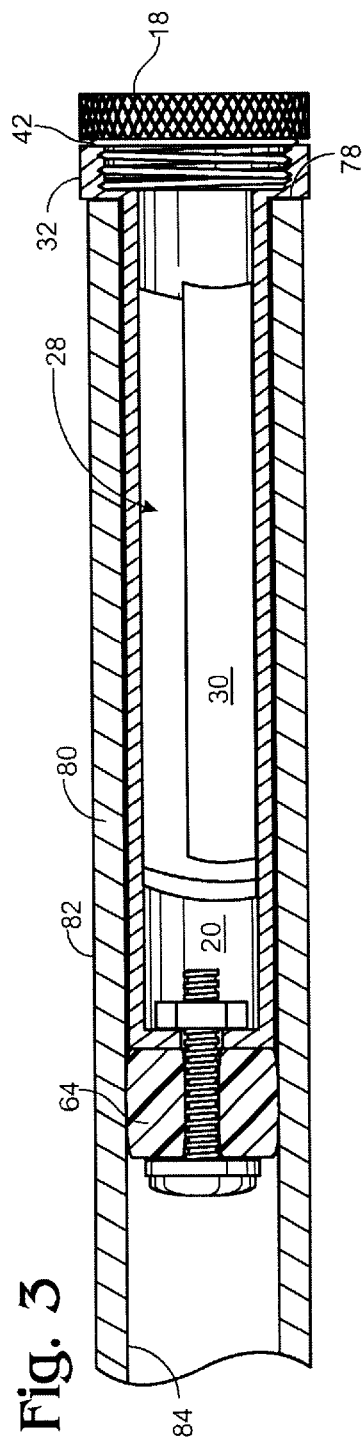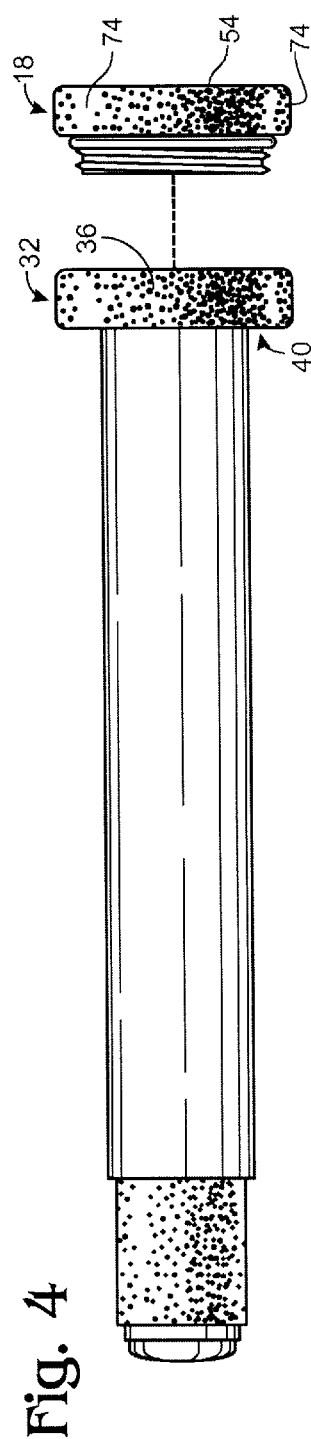

IN-HANDLE STORAGE DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

This invention relates most generally to the temporary storage of items inside a motorbike or bicycle. More specifically, this invention relates to a hollow storage tube designed to be fixedly installed inside a motorcycle or bicycle handlebar.

Devices designed to be installed on or within a pre-existing bike handle are generally found in three categories: 1) signaling devices to alert other drivers or riders; 2) mechanical devices used in operating the transport vehicle; and 3) storage units.

U.S. Pat. No. 5,950,498 (Gossett et al., Sep. 14, 1999) describes a storage unit for a bicycle that is designed to be removably engaged with a handlebar. When the user wants to store something in the handlebar, he or she first inserts it into the unit and then temporarily slides the unit into the handlebar. To retrieve the item, the entire unit is disengaged from the handlebar, and therefore each time the unit is used, the unit and its contents are subject to being dropped, lost, scratched or otherwise damaged.

U.S. Pat. No. 3,918,323 (Prager, Nov. 11, 1975) describes a motorcycle throttle-grip protector designed for fixed attachment to a motorcycle handlebar. It is designed to protect the throttle grip from damage during extreme tipping, and is not capable of serving as a storage device.

The following patents describe turn signal indicator lights designed for fixed attachment into a bike handle. By design, any tubular portion is used for holding batteries and or mechanical parts and therefore it is not available or capable of serving additionally as a storage device: U.S. Pat. No. 6,081,190 (Kellermann, Jun. 27, 2000); U.S. Pat. No. 5,247,431 (Liu, Sep. 21, 1993) U.S. Pat. No. 4,875,142 (Spector, Oct. 17, 1989); U.S. Pat. No. 4,623,954 (Schott et al., Nov. 18, 1986).

Metal end plugs designed to be inserted into the very end of a motorcycle or bicycle handlebar have been manufactured to provide the user with a decorative device with which to display trademarks or other insignia, but they are merely decorative plugs and serve no useful purpose.

What would be useful is a storage tube that could be fixedly attached to the inside of a handlebar, and in which the motorcycle's certificate of registration and/or other small items could be safely stored, protected from water and debris, and easily retrieved therefrom without having to remove the entire storage unit from the handlebar. What would also be useful is a storage unit designed to be approximately invisible or inconspicuous to casual passersby, unlike typical motorcycle storage saddlebag. What would also be useful is a storage tube cap capable of receiving engraving or decoration for identification or decorative purposes.

BRIEF SUMMARY OF THE INVENTION

The invention consists of a cylindrical storage tube designed to be fixedly installed inside a motorcycle or bicycle handlebar and having a tight-fitting removable cap, and used to secure items inside the handlebar and protect the secured items from water and debris. A first embodiment of the device is of metal manufacture, and protrudes approximately 1.46 centimeters/0.575 inches from the end of a pre-existing handlebar. The functional capability of the device is designed to be invisible to casual passers-by.

BRIEF DESCRIPTION OF THE DRAWINGS

FIG. 2 is a cut-away view of the device shown in FIG. 1 placed inside a handlebar and prior to attachment to the handlebar.

FIG. 3 is a cut-away view of the device shown in FIG. 2 after it has been fixedly attached to the handlebar.

FIG. 4 is a side elevation view of a second embodiment of the invention.

DETAILED DESCRIPTION OF THE INVENTION

Figure 1:
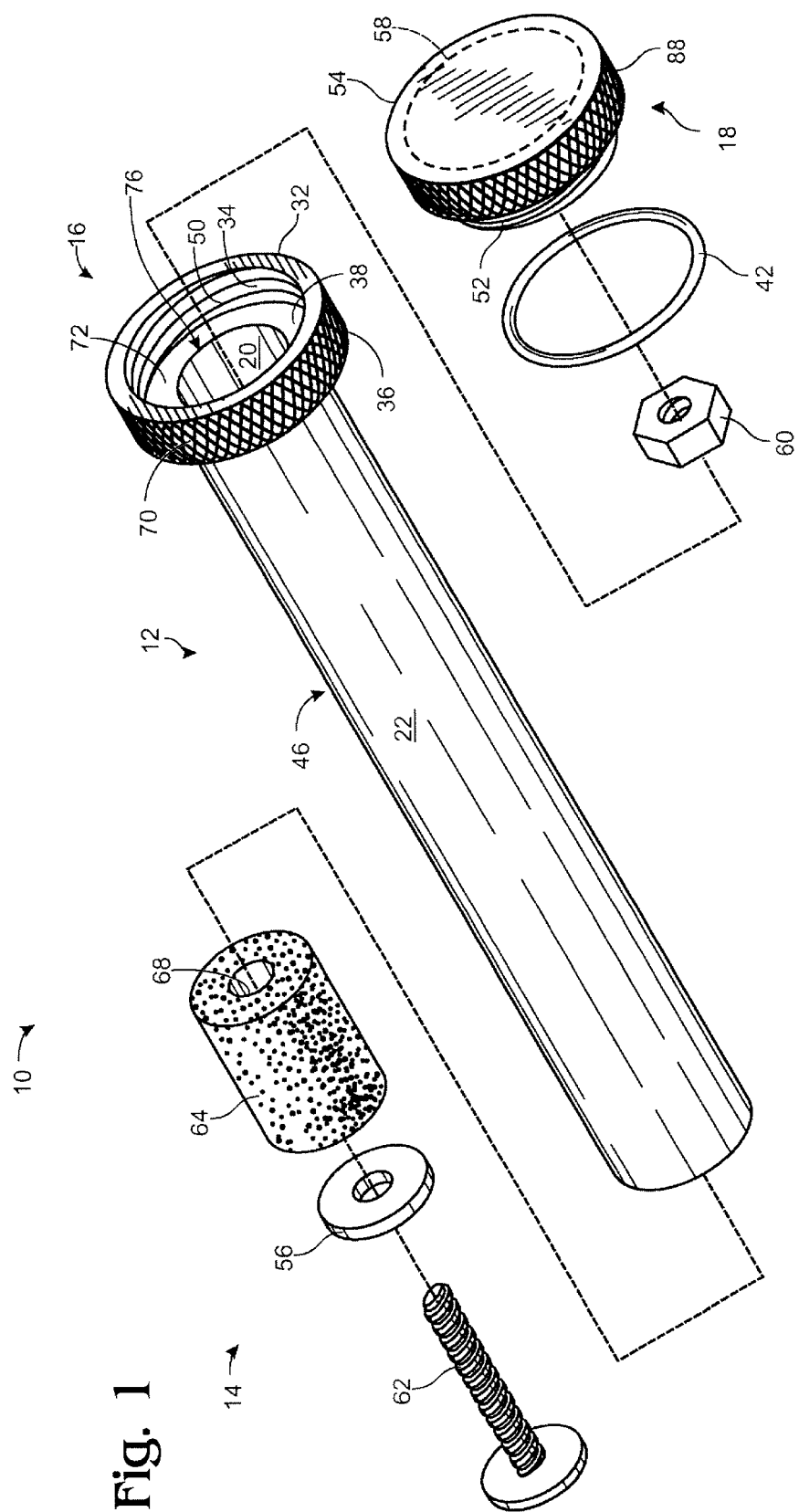
FIG. 1 is an exploded isometric view of a first embodiment of the invention.

Referring now to the drawings in greater detail, FIG. 1 shows a first embodiment of the storage device 10 comprising the present invention. The device consists of a hollow storage tube 12 with handlebar engaging means 14, cap engaging means 16, and cap 18.

As shown in FIGS. 1 and 2, storage tube 12 has a wall 46, a collar 32 depending from wall 46, and a floor 48 opposite collar 32. Collar 32 has a floor 72 depending from tube wall 46, and a collar wall 70 depending from collar floor 72. Collar floor 72 has an interior surface 38, and an exterior surface 40. Tube 12 is of approximately cylindrical shape in order to maximize the volume of the storage unit, but could be manufactured in non-cylindrical shapes.

As shown in FIG. 1, tube wall 46 has an interior surface 20, and an exterior surface 22. As shown in FIG. 2, tube floor 48 has an interior surface 24, and an exterior surface 26. As shown in FIG. 1, tube 12 has an access aperture 76 opposite floor 48.

As shown in FIGS. 1 and 2, handlebar engaging means 14 are fixedly disposed proximate to floor 48, in order to maximize the volume of space available in tube 12 for storing items. In a first embodiment shown in FIG. 1, handlebar engaging means 14 comprises a screw 62, a washer 56, a hex nut 60, and an expandable plug 64, but other means could be used that provided a fixed engagement of tube 12 to a pre-existing handlebar 80 while maximizing the volume of space available for storing items. As shown in FIG. 2, tube floor 48 has an aperture 66 through which screw 62 is removably received, and expansion plug 64 has an aperture 68 for removably receiving screw 62 before screw 62 is received through tube floor aperture 66.

As shown in FIG. 3, tube storage space 28 is approximately defined by tube wall interior surface 20. In the first and second embodiments shown in FIGS. 1 and 4, tube wall interior surface 20 is approximately 10.16 centimeters/4.0 inches long, but the length could vary somewhat. A rolled up motorcycle registration 30 is shown to be stored inside storage space 28 in FIG. 3. Storage space 28 is designed to be inconspicuous to casual passersby, and tube 12 securely closed to water and debris, and aperture 76 fully blocked, when cap 18 is fully engaged with collar 32.

As shown in FIGS. 1 and 3, collar 32 provides means for engaging cap 18, and means for aligning access aperture 76 proximate to handlebar end 78.

In the embodiments shown in FIGS. 1 and 3, In a first embodiment as shown in FIG. 1, collar 32 is circular in shape, and collar wall 70 is approximately 0.76 centimeters/0.300 inches wide, but collar 32 may have another predetermined shape. As shown in FIG. 1, collar wall 46 has an exterior surface 36 and an interior surface 34 with grooves 50 for removably receiving threaded cap stem 52.

As shown in FIGS. 1 and 3, cap 18 has a visually perceptible shape that matches the visually perceptible shape of collar 32 when cap 18 is received in collar 32. In the embodiments shown in FIGS. 1 and 4, both cap 18 and collar 32 are circular, but other shapes may be used.

As shown in FIG. 1, Cap 18 has an exterior end 54, a wall 88 and a threaded cylindrical stem 52 depending therefrom designed to removably engage grooves 50 in collar 32. In the embodiments shown in FIGS. 1 and 4, the width of cap wall 88 is approximately 0.68 centimeters/0.270 inches, but the width of wall 88 could vary.

In the embodiments shown in FIGS. 2 and 4, cap stem 52 also has an O-ring 42 removably received within a cap stem recess 44 proximate to cap wall 88. O-ring recess 44 and O-ring 42 provide means to deeply engage cap 18 within collar 32 and thereby reduce any gap between cap 18 and collar 32 when the cap is engaged as shown in FIG. 3; help make the cap and storage functions of device 10 inconspicuous to casual passersby, and to provide a water and debris resistant storage unit.

In the embodiment shown in FIG. 1, cap 18 and collar 32 have visually perceptible surfaces 54, 74, 36 that match each other in appearance. In FIG. 1, surfaces 54, 74, 36 are metallic in appearance and designed to blend in with the metallic exterior surface 82 of pre-existing handlebar 80, however surfaces 54, 74, 36 could all appear to be black or some other color and/or texture.

In the first embodiment of the device shown in FIG. 1, cap end 54 has a surface area 58 designed for fixedly receiving identifying or decorative symbols by etching, engraving or the like, however cap end 54 may be left blank.

In a second embodiment of the device as shown in FIG. 4, cap end 54, cap wall exterior surface 74, and collar wall exterior surface 36 are colored in order to blend in with standard handlebar grip material composed of rubber, polyvinyl or the like, and provide a storage unit and cap that is inconspicuous to casual passersby. In the second embodiment, cap end 54 and collar exterior surfaces 36, 40 are manufactured with a coat of black rubberized or polyvinyl material.

As shown in FIGS. 2 and 3, the device is designed to fixedly attach to a pre-existing hollow cylindrical handlebar 80, having an exterior surface 82, an interior surface 84, an a handlebar end 78.

When installing the device, the user should ensure that the handlebar's interior surface 84 is smooth, as shown in FIG. 2, and no metal burrs or rough edges are present that could scratch or block insertion of storage device 10. To install the device on a pre-existing motorcycle or bicycle handlebar that has a rubber coating covering handlebar end 78, the user must first cut an entry hole in the rubber coating.

Prior to insertion of tube 12 into handlebar 80, the user should ensure that washer 56, plug 64 and hex nut 60 are securely disposed on screw 62 as shown in FIG. 2. Washer 56 abuts plug 64, hex nut 60 abuts tube floor interior surface 24, and collar floor exterior surface 40 abuts handlebar end 78.

To install the device 10, tube 12 is uncapped and is inserted through handlebar end 78 and into handlebar 80 so that collar floor exterior surface 40 abuts handlebar end 78 as shown in FIG. 2. As shown in FIG. 2, plug 64 does not frictionally engage handlebar interior surface 84 when tube 12 is first received into handlebar 80, because the diameter of plug 64 when plug 64 is in a non-compressed state is smaller than the interior diameter of handlebar 80, as shown by the existence of gap 86 between plug 64 and handlebar interior surface 84.

To fix the device inside handlebar 80 after it has been initially received in handlebar 80 as shown in FIG. 2, hex nut 60 is tightened, by using tools common to such a task such as a socket drive, a drive extension and drive ratchet, while keeping pressure on the unit to keep it deep into the handle and pressed against handlebar end 78. Tightening hex hut 60 causes plug 64 to expand and bulge outwardly, and thereby frictionally engage handlebar interior surface 84, as shown in FIG. 3.

Finally, the user may place items into storage space 28 and secure the stored items by screwing cap 18 into the collar 32.

If tube 12 should come loose from handlebar 80, the user may empty tube 12 of stored items, loosen hex nut 60 and re-fix tube 12 by pushing it back into handlebar 80 and re-tightening hex nut 12.

Although the presently preferred embodiment of the invention has been disclosed in detail in order to comply with the patent laws, it will be understood that the scope of the invention is to be judged only in accordance with the appended claims.

What is claimed is:

1. An in-handle storage device comprising:
   a hollow tube having a wall with an interior surface and an exterior surface, a floor, and an open end opposite said floor;
   means to fixedly engaging said tube to the interior surface of a pre-existing handlebar, said means adjacent said floor of said tube;
   handlebar end engaging means depending from said tube wall;
   cap engaging means on said open end of said tube wall;
   a cap removably engaged to said cap engaging means; and
   a storage space defined by said tube wall interior surface, said storage space designed to be inconspicuous to casual passersby when said cap is fully engaged in said cap engaging means.

2. The device of claim 1 wherein said cap engaging means further comprise a first exterior surface, and wherein said cap further comprises a second exterior surface; and wherein said first and second exterior surfaces have visually perceptible matching appearances.

3. The device of claim 2 wherein said cap engaging means further comprises a first shape and wherein said cap further comprises a second shape; and wherein said first and second shapes further comprise a visually perceptible match when said cap is engaged in said cap engaging means.

4. The device of claim 1 wherein said handlebar engaging means further comprise:
   an aperture through said tube floor;
   a screw removably received through said tube floor aperture;
   a washer removably received by said screw;
   an expandable plug removably received by said screw; and a hex nut removably received by said screw; wherein
insertion of said tube into a pre-existing handlebar, and tightening of said hex nut onto said screw causes said expansion plug to compress and bulge outwardly and thereby frictionally engage said handlebar wall and thereby cause said device to become fixedly attached to said handlebar.

5. The device of claim 4 wherein said cap engaging means further comprise a collar having a wall, a floor, and an exterior end; and wherein said collar wall has an interior surface with grooves, and an exterior surface; and wherein said collar floor has an interior surface, and an exterior surface abutable against the end of a pre-existing handlebar; and wherein said handlebar end engaging means comprises said collar floor exterior surface; and wherein said cap further comprises an exterior end, a wall depending therefrom, and a stem opposite said exterior end having threads for removably engaging said collar grooves.

6. The device of claim 5 wherein said tube wall further comprises an approximately cylindrical shape.

7. The device of claim 5 wherein said cap further comprises:

an annular recess in said cap stem proximate to said cap wall for removably receiving an O-ring and thereby providing a water and debris resistant fit of said cap to said collar; and an O-ring removably receivable by said recess.

8. The device of claim 7 wherein said tube wall further comprises an approximately cylindrical shape.

9. The device of claim 7 wherein said cap exterior end further comprises an exterior surface area for fixedly receiving identifying or decorative symbols.

10. The device of claim 9 wherein said tube wall further comprises an approximately cylindrical shape.

11. The device of claim 9 wherein said collar further comprises an exterior surface; and wherein said cap further comprises an exterior surface; and wherein said collar exterior surface and said cap exterior surface have visually perceptible matching appearances.

12. The device of claim 11 wherein said tube wall further comprises an approximately cylindrical shape.

13. The device of claim 11 wherein said collar and said cap have visually perceptible matching shapes when said cap is received in said collar.

14. The device of claim 13 wherein said collar and cap exterior surfaces further comprise a black appearance.

15. The device of claim 13 wherein said collar and cap exterior surfaces further comprise a rubber appearance.

16. The device of claim 13 wherein said collar and cap exterior surfaces further comprise a metallic appearance.

17. The device of claim 13 wherein said tube wall further comprises an approximately cylindrical shape.

\* \* \* \* \*